United States Patent
Solheim et al.

(10) Patent No.: US 9,573,032 B2
(45) Date of Patent: *Feb. 21, 2017

(54) FITTING SYSTEM FOR GOLF EQUIPMENT USING CAMERA IMAGE FOR MEASUREMENT OF INDIVIDUAL AND RELATED METHODS

(71) Applicant: KARSTEN MANUFACTURING CORPORATION, Phoenix, AZ (US)

(72) Inventors: John K. Solheim, Anthem, AZ (US); Roger J. Cottam, Mesa, AZ (US)

(73) Assignee: KARSTEN MANUFACTURING CORPORATION, Phoenix, AZ (US)

( * ) Notice: Subject to any disclaimer, the term of this patent is extended or adjusted under 35 U.S.C. 154(b) by 130 days.

This patent is subject to a terminal disclaimer.

(21) Appl. No.: 14/460,162

(22) Filed: Aug. 14, 2014

(65) Prior Publication Data
US 2014/0354793 A1 Dec. 4, 2014

Related U.S. Application Data

(63) Continuation of application No. 13/465,304, filed on May 7, 2012, now Pat. No. 8,926,454.

(51) Int. Cl.
G06K 9/46 (2006.01)
G06T 7/60 (2006.01)
G06T 7/00 (2006.01)

(52) U.S. Cl.
CPC ............ *A63B 60/42* (2015.10); *G06T 7/0014* (2013.01); *G06T 7/60* (2013.01); *A63B 2220/807* (2013.01); *G06T 2207/10004* (2013.01); *G06T 2207/30196* (2013.01)

(58) Field of Classification Search
CPC ........... G06T 2207/10004; G06T 2207/30196; G06T 7/0014; G06T 7/60; A63B 60/42; A63B 2069/3605; A63B 2220/807; A63B 53/00; A41H 1/02; A61B 5/107; A61B 5/1079
See application file for complete search history.

(56) References Cited

U.S. PATENT DOCUMENTS

| | | | |
|---|---|---|---|
| 3,902,182 | A | 8/1975 | Hillborg |
| 5,911,636 | A | 6/1999 | Schmoll |
| 5,937,213 | A | 8/1999 | Wakabayashi et al. |
| 5,956,525 | A | 9/1999 | Minsky |
| 6,734,980 | B1 | 5/2004 | Brash et al. |
| 6,779,277 | B2 | 8/2004 | Sones |
| 7,250,005 | B2 | 7/2007 | Wood et al. |
| 7,311,611 | B2 | 12/2007 | Cameron et al. |

(Continued)

*Primary Examiner* — Justin Myhr

(57) ABSTRACT

In one example, a system for fitting golf equipment for an individual can be configured to be used with an electronic device comprising a fitting processor module and a camera. The system can comprise an image analysis module configured to receive image data of at least a portion of the individual and one or more physical indicia proximate to the individual, where the image data can be captured by the camera. The image analysis module can also be configured to recognize one or more reference features of the individual from the image data, and to calculate one or more fitting dimensions between the one or more reference features in the image data. Other examples, devices, and related methods are also disclosed herein.

20 Claims, 7 Drawing Sheets

(56) References Cited

U.S. PATENT DOCUMENTS

| | | |
|---|---|---|
| 7,867,110 B2 | 1/2011 | Edel |
| 8,350,909 B2 | 1/2013 | Mori |
| 8,512,615 B1 * | 8/2013 | Amdur .......................... 264/222 |
| 8,559,766 B2 | 10/2013 | Titt et al. |
| 2004/0168329 A1 | 9/2004 | Ishimaru |
| 2010/0022332 A1 | 1/2010 | Van Horn |
| 2011/0191204 A1 | 8/2011 | Litke et al. |

* cited by examiner

FITTING SYSTEM FOR GOLF EQUIPMENT USING CAMERA IMAGE FOR MEASUREMENT OF INDIVIDUAL AND RELATED METHODS

CROSS-REFERENCE TO RELATED APPLICATIONS

This patent application is a continuation of U.S. patent application Ser. No. 13/465,304, filed on May 7, 2012.

The disclosure of the referenced application is incorporated herein by reference.

TECHNICAL FIELD

The present disclosure relates generally to sports equipment, and relates, more particularly, to golf fitting systems and related methods.

BACKGROUND

Although conceptually simple, golf is a game that requires much practice to develop a player's skill in terms of mental and muscle coordination for repeatability and consistency of shots. Proper golf equipment can be important for better and consistent performance, and determining what golf equipment is best suited for an individual often involves trial and error that can be costly and time consuming. To ensure an individual is playing with appropriate equipment, the individual may be custom fitted for golf equipment via an individualized fitting process. Such fitting process may require measuring several characteristic features or dimensions of the individual, and determining proper equipment therefrom. Determining such characteristic features or dimensions in a repeatable and precise manner can often be difficult, especially where several fitters are involved. Considering the above, further developments can be made to positively impact golf fitting systems and related methods.

BRIEF DESCRIPTION OF THE DRAWINGS

The present disclosure will be better understood from a reading of the following detailed description of examples of embodiments, taken in conjunction with the accompanying figures in the drawings.

Figure 1:
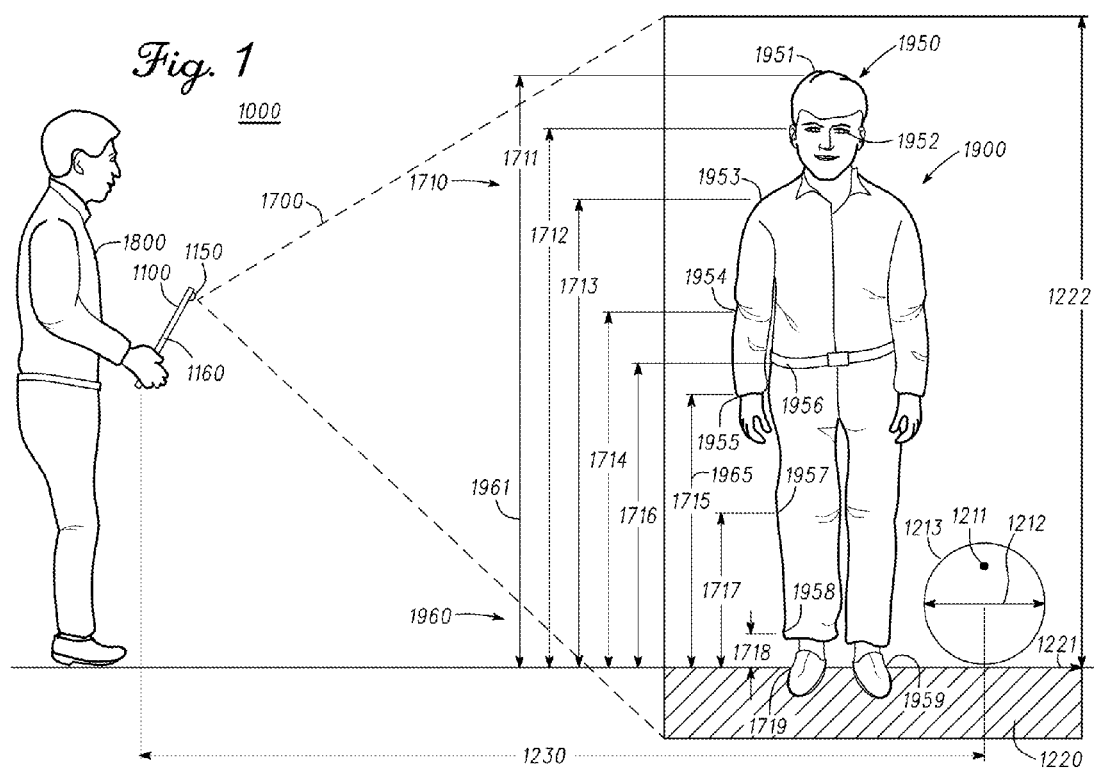
FIG. 1 illustrates a side view of a system for fitting golf equipment for an individual.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types. The absence of the word "removably," "removable," and the like near the word "coupled," and the like does not mean that the coupling, etc. in question is or is not removable.

DETAILED DESCRIPTION

In one embodiment, a system for fitting golf equipment for an individual can be configured to be used with an electronic device comprising a fitting processor module and a camera. The system can comprise an image analysis module configured to receive image data of at least a portion of the individual and one or more physical indicia proximate to the individual, the image data captured by the camera, recognize one or more reference features of the individual from the image data, and calculate one or more fitting dimensions between the one or more reference features in the image data. The image analysis module can be configured to be executed by the fitting processor module.

In one embodiment, a method for fitting golf equipment for an individual can comprise providing an image analysis module configured for receiving image data of at least a portion of the individual and one or more physical indicia proximate to the individual, recognizing one or more reference features of the individual from the image data, and calculating one or more fitting dimensions between the one or more reference features in the image data. The image data can be received from an image capture module of a golf-fitting electronic device comprising a camera. The image analysis module can be configured to be executed by an electronic processor.

In one embodiment, an image analyzer for fitting golf equipment for an individual can be configured to be used with an electronic device comprising a fitting processor module and a camera. The image analyzer can comprise an image processing module configured to receive image data of at least a portion of the individual and one or more physical indicia proximate to the individual, the image data captured by the camera, and recognize one or more reference features of the individual from the image data. The image analyzer can also comprise a fitting module configured to calculate one or more fitting dimensions between the one or more reference features in the image data.

In another embodiment, a system for fitting golf equipment for an individual can be configured to be used with an electronic device comprising a fitting processor module and a camera. The system can comprise an image analysis module configured to receive image data of at least a portion of the individual and one or more physical indicia, pursuant to which the single picture is aligned. The image analysis module can be further configured to recognize one or more reference features of the individual from the image data of the single picture and calculate one or more fitting dimensions of the individual between the one or more reference features in the single picture. The portion of the individual in the single picture comprises at least a hand of the individual. The image analysis module can be configured to be executed by the fitting processor module.

In one embodiment, a method for fitting golf equipment for an individual can comprise providing an image analysis module configured for receiving image data of a single picture captured by a camera and depicting at least a hand of the individual and one or more physical indicia, pursuant to which the single picture is aligned. The single picture is received from an image capture module of a handheld golf-fitting electronic device comprising a fitting processor module and the camera. The method can further comprise recognizing one or more reference features of the individual from the single picture and calculating one or more fitting dimensions from the single picture captured by the camera. The image analysis module can be configured to be executed by an electronic processor module.

In another embodiment, an image analyzer for fitting golf equipment for an individual can be configured to be used with an electronic device comprising a fitting processor module and a camera. The image analyzer can comprise an image processing module configured to receive image data of at least a hand of the individual and one or more physical indicia, pursuant to which the single picture is aligned, and recognize one or more reference features of the individual from the image data of the single picture. The image analyzer can also comprise a fitting module configured to calculate one or more fitting dimensions of the hand of the individual between the one or more reference features in the single picture.

Other examples and embodiments are further disclosed herein. Such examples and embodiments may be found in the figures, in the claims, and/or in the present description.

Turning to the drawings, FIG. 1 illustrates a view of system 1000 for fitting golf equipment for individual 1900. System 1000 is configured to be used with electronic device 1100 comprising camera 1150 coupled to fitting processor module 1160, where camera 1150 is configured to capture image data 1700 of individual 1900 for processing by fitting processor module 1160.

In some examples, camera 1150 can comprise an optical lens, and image data 1700 can comprise image optical data received via the optical lens of camera 1150. In the same or other examples, camera 1150 can comprise a depth sensor, and image data 1700 can comprise image depth data received via the depth sensor of camera 1150. In such examples, the depth sensor can comprise an infrared laser projector combined with a monochrome CMOS sensor, similar to the depth sensor of the Kinect® device from Microsoft Corporation, of Redmond, Wash.

Figure 2:
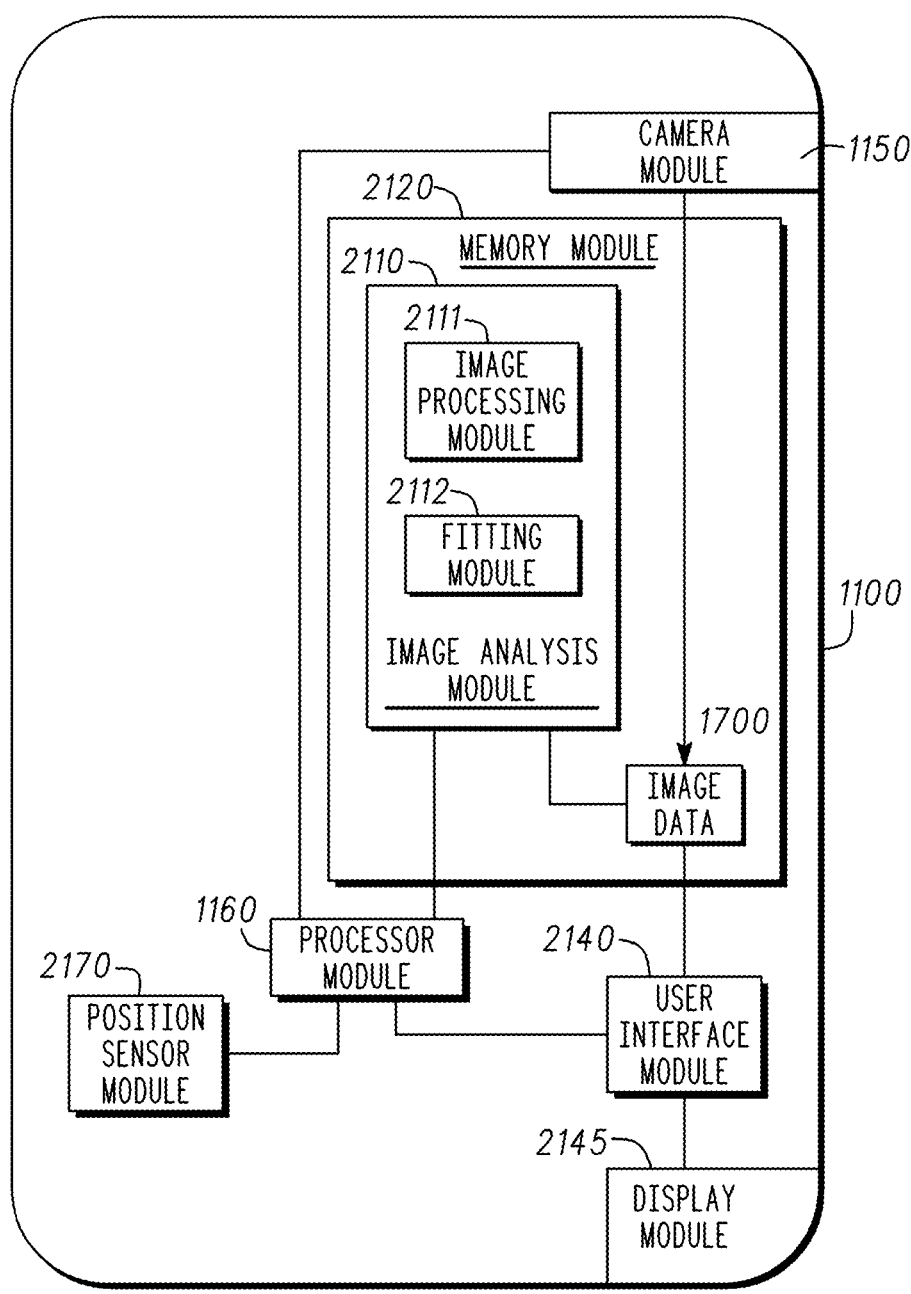
FIG. 2 illustrates a sample schematic of an electronic device suitable for using with the system of FIG. 1.

FIG. 2 illustrates a sample schematic of electronic device 1100. Electronic device 1100 can be, for example, a mobile device or a personal computer. In some examples, electronic device 1100 can include electrical devices of many types and designs such as cellular phones, personal digital assistants (PDA)s, tablet computers, "smartphones" and/or other devices incorporating one or more of the above (e.g., media players, telephones, audio-visual media players, devices incorporating media players, telephones, and/or audio-visual devices, and/or handheld game consoles). For example, electronic device 1100 can be an electrical device manufactured by Apple Computer, Inc. of Cupertino, Calif. (e.g., an iPod® MP3 player, an iPod Touch® device, an iPad® device, and/or an iPhone® device). There can also be examples where electronic device 1100 can be a portable computer, such as a notebook, laptop, or netbook computer. In other examples, electronic device 1100 can be a non-portable computer, such as a desktop computer. In such examples, camera 1150 can be part of the non-portable computer, or can be coupled to the non-portable computer via a wired or wireless mechanism.

System 1000 comprises image analysis module 2110, which is executable by fitting processor module 1160 and physically contained in memory module 2120 as part of electronic device 1100 in the present example. Fitting processor module 1160 of electronic device 1100 is coupled to memory module 2120 and camera module 1150. In some examples, memory module 2120 can comprise one or more types of memory, such as a hard disk and/or a solid state storage device, like flash memory. Memory module 2120 can also comprise an operating system module configured to run on fitting processor module 1160 to operate and/or manage different functions of electronic device 1100. Electronic device 1100 also comprises user interface module 2140 coupled to display module 2145 in the present example, where user interface module 2140 can be configured to generate display signals for a graphical user interface displayed on display module 2145, and/or to process user input signals received via the graphical user interface from user 1800 (FIG. 1). Display module 2145 can comprise a touch screen display of electronic device 1100 in some embodiments. Nevertheless, although display module 2145 and camera 1150 are shown as internal to electronic device 1100 in the present example, there can be other examples where display module 2145 and/or camera 1150 can be distinct from electronic device 1100.

Image analysis module 2110 is configured to receive image data 1700 from camera module 1150, where image data 1700 comprises image information about individual 1900 and one or more physical indicia such as physical indicia 1210 proximate to individual 1900 (FIG. 1). Image data 1700 may be received directly by image analysis module 2110, or stored at memory module 2122 for eventual access by image analysis module 2110. Image analysis module 2110 can be configured to recognize one or more reference features 1950 of individual 1900 from image data 1700 (FIG. 1). In some examples, as illustrated in FIG. 1, the one or more reference features 1950 can comprise one or more of head top 1951, eye 1952, shoulder 1953, elbow 1954, wrist 1955, hip 1956, knee 1957, ankle 1958, or foot 1959 of individual 1900. In the present example, physical indicia 1210 is located tangent to ground plane 1220, and image analysis module 2110 (FIG. 2) can be configured to determine a position or orientation of horizontal axis 1221 of ground plane 1220 based on such tangency. In some examples, image analysis module 2110 (FIG. 2) can be configured to recognize a location of foot 1959 of individual 1900, and determine a position or orientation of horizontal axis 1221 of ground plane 1220 therefrom.

Based on reference features 1950, image analysis module 2110 (FIG. 2) can calculate one or more fitting dimensions 1710 of individual 1900 between the one or more of reference features 1950. As an example, the one or more fitting dimensions 1710 can comprise one or more of head-top-to-floor distance 1711, eye-to-floor distance 1712, shoulder-to-floor distance 1713, elbow-to-floor distance 1714, wrist-to-floor distance 1715, hip-to-floor distance 1716, knee-to-floor distance 1717, ankle-to-floor distance 1718, or foot-to-floor distance 1719 with respect to individual 1900. By calculating the one or more fitting dimensions 1710 from image data 1700, image analysis module 2110 can transform image data 1700 into one or more fitting attributes 1960 of individual 1900 based on the one or more fitting dimensions 1710. For example, fitting attributes 1960 can comprise height 1961, based on head-top-to-floor distance 1711. Fitting attributes 1960 can also comprise shaft length attribute 1965 based on wrist-to-floor distance 1715 of individual 1900.

Figure 3:
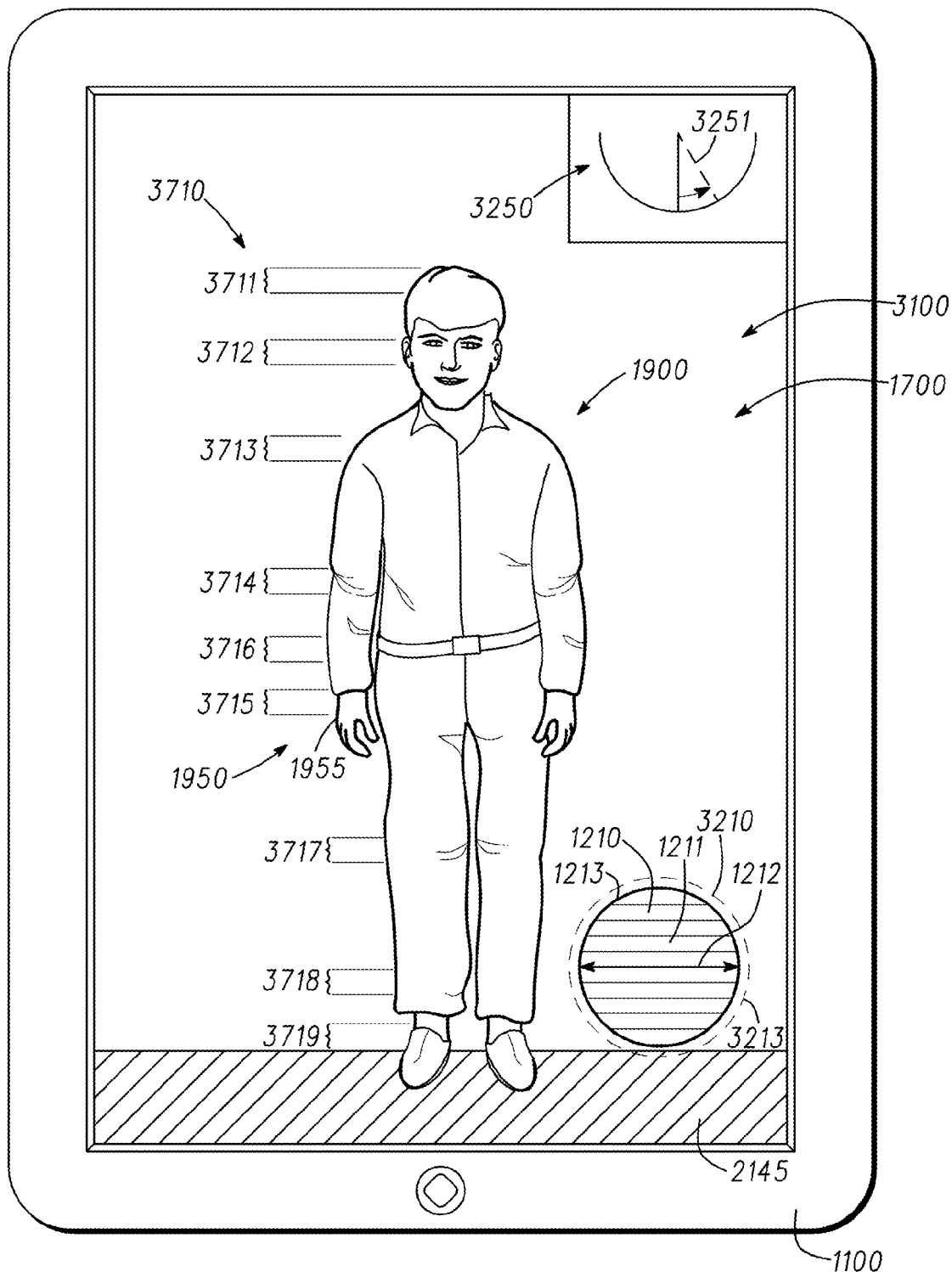
FIG. 3 illustrates a view of an on-screen interface presenting image data gathered from the system of FIG. 1 for determining one or more reference features for fitting the individual.

In the present example, user interface module 2140 (FIG. 2) is executable by fitting processor module 1160 (FIGS. 1-2) and is configured to generate on-screen interface 3100, which can be displayed at display module 2145 as seen in FIG. 3. On-screen interface 3100 comprises an illustration of image data 1700 depicting individual 1900 and the one or more reference features 1950 relative to physical indicia such as physical indicium 1210.

In the present example, user interface module 2140 (FIG. 2) is configured to receive from user 1800 (FIG. 1) one or more reference feature markers 3710 entered at on-screen interface 3100 (FIG. 3) designating a location of at least a portion of the one or more reference features 1950 as illustrated in on-screen interface 3100. For example, user 1800 (FIG. 1) may touch or click at or proximate to wrist 1955 at on-screen interface 3100 (FIG. 3), and user interface module 2140 (FIG. 2) may receive such input from user 1800 as designating a location for wrist reference feature marker 3710 for wrist 1955. There can also be examples where image analysis module 2110 (FIG. 2) can be configured to recognize at least a portion of the one or more reference features 1950 (FIGS. 1, 3) automatically by detecting such one or more reference features 1950 from image data 1700 without the need for user 1800 to manually enter into on-screen interface 3100 the one or more reference feature markers 3710 (FIG. 3). In the same or other examples, user interface module 2140 can be configured such that user 1800 can still correct or adjust the location of the one or more reference features 1950 identified by image analysis module 2110 by entering one or more reference features 3710 at on-screen interface 3100.

In the same or other examples, user interface module 2140 (FIG. 2) may amend or insert into image data 1700 (FIG. 2) information about the one or more reference feature markers 3710 once entered by user 1800 (FIG. 1) or once recognized by image analysis module 2110 (FIG. 2). User interface module 2140 (FIG. 2) may also cause on-screen interface 3100 (FIG. 3) to illustrate the one or more reference feature markers 3710, such as shown in FIG. 3. Reference feature markers 3710 may comprise, for example, head top reference marker 3711 eye reference marker 3712, shoulder reference marker 3713, elbow reference marker 3714, wrist reference marker 3715, hip reference marker 3716, knee reference marker 3717, ankle reference marker 3718, foot reference marker 3719, as seen in FIG. 3, and/or others.

Figure 4:
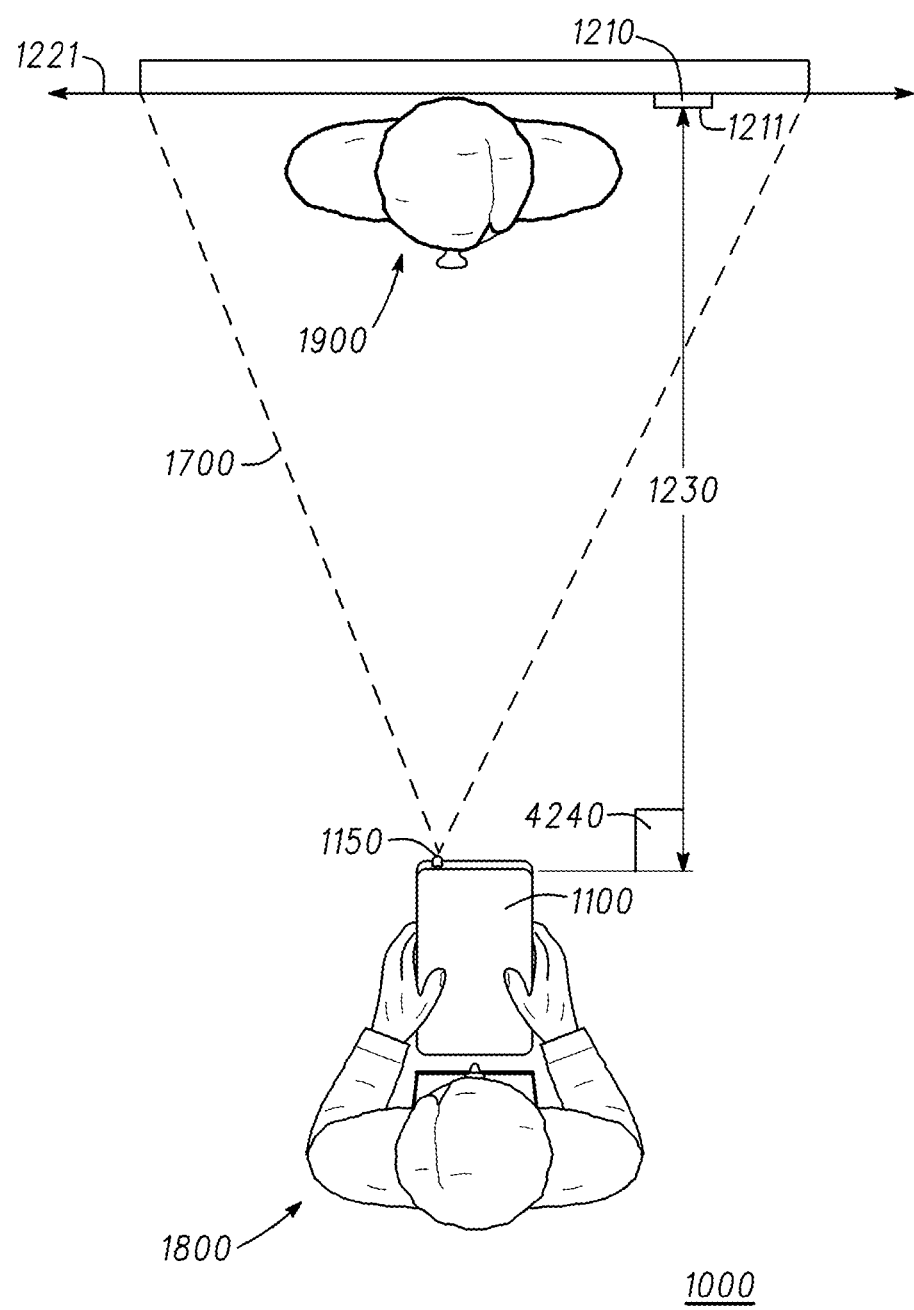
FIG. 4 illustrates a top view of the system of FIG. 1.

Image analysis module 2110 (FIG. 2) is configured to analyze image data 1700 with respect to individual 1900 and relative to physical indicia such as physical indicium 1210. Physical indicium 1210 can be located proximate to individual 1900 (FIGS. 1, 3), and may be used as a reference feature to align camera module 1150 (FIG. 1) and/or electronic device 1100 for properly capturing image data 1700. In the present embodiment, on-screen interface 3100 is configured to present on-screen indicium 3210, which can be aligned by user 1800 (FIG. 1) with physical indicium 1210 by moving camera 1150 (FIG. 1) or electronic device 1100 accordingly. At least one of a target distance 1230 (FIG. 1) or a target orientation 4240 (FIG. 4) of on-screen interface 3100, relative to physical indicium 3210, relative to horizontal axis 1221, and/or relative to vertical axis 1222, may be set by aligning on-screen indicium 3210 with physical indicium 1210 at on-screen interface 3100. In the present example, target orientation 4240 is substantially perpendicular to horizontal axis 1221 and/or physical indicium 1210.

Physical indicium 1210 (FIGS. 1, 3, 4) comprises surface 1211 having a geometrical physical shape with one or more physical dimensions, such as diameter 1212 and perimeter 1213, where diameter 1212 is configured to be substantially parallel to horizontal axis 1221 and ground plane 1220, and is also configured to be located over ground plane 1220. On-screen indicium 3210 (FIG. 3) comprises a geometrical on-screen shape with one or more on-screen dimensions corresponding to the one or more physical dimensions of physical indicium 1210. Target distance 1230 can thus be established between on-screen interface 3100 and physical indicium 1210 when the one or more on-screen dimensions of on-screen indicium 3210 are aligned at on-screen interface 3100 with the one or more physical dimensions of surface 1211 of physical indicium 1210. In the present example, the geometrical physical shape of physical indicium 1210 comprises a circle, and the geometrical on-screen shape of on-screen indicium 3210 also comprises a circle. Circular perimeter 3213 of on-screen indicium 3210 is configured to match circular perimeter 1213 of physical indicium 1210 when target distance 1230 and target orientation 4240 are established between camera 1150 and physical indicium 1210. For example, if camera 1150 were too close to physical indicium 1210, on-screen perimeter 3213 would appear larger at on-screen interface 3100 than physical perimeter 1213, and vice/versa. As another example, if camera 1150 were not properly oriented relative to physical indicium 1210, physical perimeter 1213 of physical indicium 1210 may appear somewhat oval-shaped or not fully circular at on-screen interface 3100, such that circular perimeter 3213 of on-screen indicium 3210 may not match physical perimeter 1213 of physical indicium 1210 until target orientation 4240 (FIG. 4) is achieved.

There can be examples where user interface module 2140 (FIG. 2) and/or image analysis module 2110 (FIG. 2) may recognize a misalignment of camera 1150 relative to physical indicium 1210, and may cause user interface 3100 to display one or more on-screen guidance to user 1800 (FIG. 1) for properly aligning camera 1150 accordingly with respect to target distance 1230 and/or target orientation 4240. In the same or other examples, user interface module 2140 (FIG. 2) and/or image analysis module 2110 (FIG. 2) may be configured to present leveling on-screen indicia 3250 (FIG. 3) at on-screen interface 3100, where leveling on-screen indicia 3250 can be configured to guide a vertical alignment of on-screen interface 3100 with gravitational axis 3251 (FIG. 3) based on feedback from a gravitational sensor of position sensor module 2170 (FIG. 2).

Figure 5:
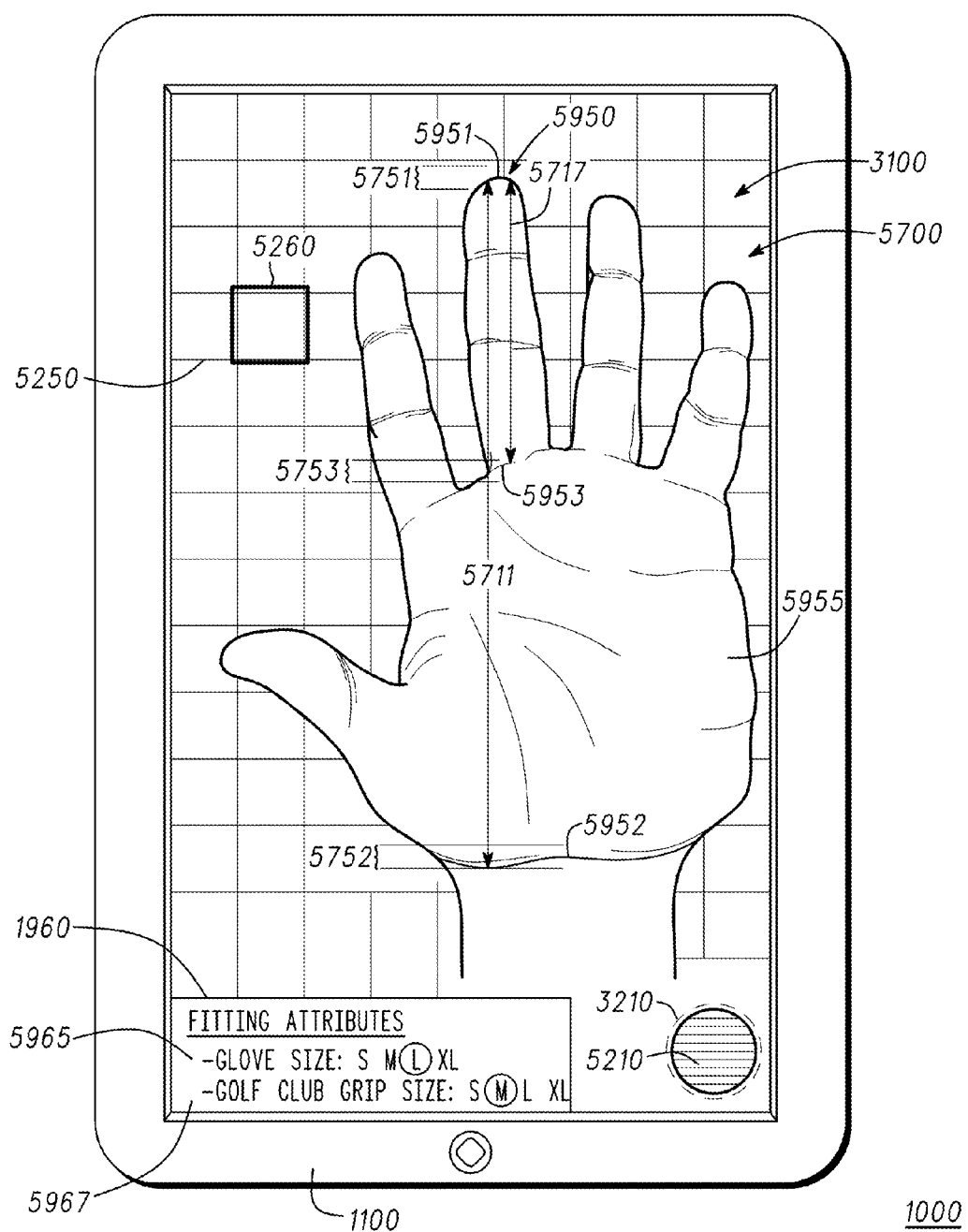
FIG. 5 illustrates a view of an on-screen interface presenting image data gathered from the system of FIG. 1 for determining one or more hand reference features for fitting the individual.

FIG. 5 illustrates a view of on-screen interface 3100 configured for determining a glove size of hand 5955 of individual 1900 (FIG. 1). In the present example, camera 1150 (FIG. 1) is configured to capture image data 5700 comprising an image of hand 5955 of individual 1900 (FIG. 1). Hand 5955 is positioned proximate to physical indicium 5210 in the present implementation, where physical indicium can be similar to physical indicium 1210 as described above with respect to FIGS. 1, 3, and 4. On-screen indicium 3210 of on-screen interface 3100 is configured in the present example to match physical indicium 5210 when camera 1150 is properly aligned, with respect to distance and orientation, relative to physical indicium 5210. Alternatively, camera 1150 may be aligned relative to a grid located proximate hand 5955, such as grid physical indicium 5250. In the present example, on-screen interface 3100 is configured to present on-screen indicium 5260, which can be aligned by user 1800 (FIG. 1) with one or more cells of grid physical indicium 5250 to establish a target distance and/or target orientation of camera 1150 relative to grid physical indicium 5250. In other examples, the cells of grid physical indicium may comprise dimensions input into or otherwise known by image analyzer module 2110, from which image analyzer module may calculate a scale of image data 5700 via extrapolation based on the number of pixels representing each cell of grid physical indicium 5250.

In the present example of FIG. 5, image data 5700 comprises reference features 5950, similar to reference features 1950 (FIG. 1), but with respect to hand 5955. Reference features 5950 comprise middle fingertip 5951 and middle finger base crease 5953 of the middle finger of hand 5955, and wrist crease 5952 of the wrist of hand 5955. In some examples, as described above with respect to reference feature markers 3710 (FIG. 3), reference feature markers 5751, 5753, and 5752 may be respectively entered for the locations of middle fingertip 5951, middle finger base crease 5953, and wrist crease 5952 by user 1800 into on-screen interface 3100, and/or such locations may be automatically recognized by image analyzer module 2110 (FIG. 2). Once camera 1150 (FIG. 1) is aligned relative to physical indicium 5210 and/or grid physical indicium 5250 as described above, based on the locations of middle fingertip 5951 and wrist crease 5952, image analysis module 2110 (FIG. 2) can calculate handsize fitting dimension 5711 corresponding to a distance between middle fingertip 5951 and wrist crease 5952. Similarly, image analysis module 2110 can calculate handgrip fitting dimension 5717 corresponding to the distance between middle fingertip 5951 and middle finger base crease 5953. Based on its calculation of handsize fitting dimension 5711, image analysis module 2110 can then calculate glove size 5965 as one of fitting attributes 1960 for individual 1900 (FIG. 1). Similarly, based on its calculation of handgrip fitting dimension 5717, image analysis module 2110 can calculate golf club grip size 5967 as one of fitting attributes 1960 for individual 1900 (FIG. 1).

Figure 6:
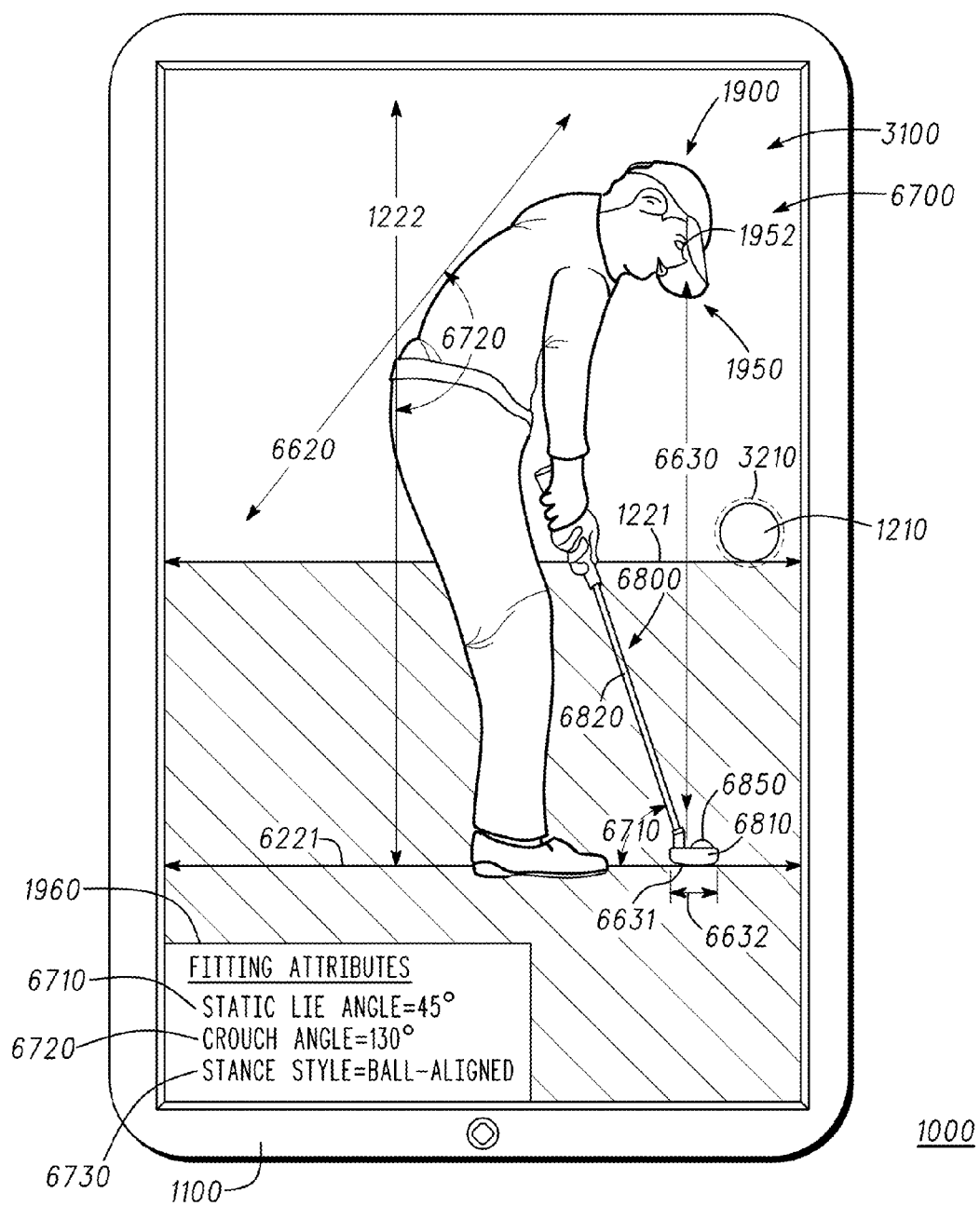
FIG. 6 illustrates a view of an on-screen interface presenting image data gathered from the system of FIG. 1 for determining one or more reference features for fitting the individual with respect to an address stance.

FIG. 6 illustrates a view of on-screen interface 3100 configured for determining a static lie angle 6710 for individual 1900. In the present example, camera 1150 is configured to capture image data 6700 comprising an image of individual 1900 in an address stance with golf club 6800. In some examples, camera 1150 can be aligned to capture image data 6700 as described above with respect to image data 1700 (FIGS. 1-4) and/or in relation to physical indicium 1210 and on-screen indicium 3210. The position or orientation of horizontal axis 1221 can also be determined by image analysis module 2110, as described above with respect to FIGS. 1-4. Image analysis module is also configured in the present example to determine a position or orientation of horizontal axis 6221, which can be located relative to horizontal axis 1221. For example, after determining a location of horizontal axis 1221, image analysis module 2110 can recognize a location of horizontal axis 6221 to be parallel to horizontal axis 1221 and tangent to either foot 1959 of individual 1900 or club head 6810 of golf club 6800. There can also be examples where horizontal axis 6221 may be entered manually by user 1800 (FIG. 1) into on-screen interface 3100 for image analysis module 2110 (FIG. 2).

In the present example, image analysis module 2110 (FIG. 2) can also be configured to recognize shaft axis 6820 of a shaft of club head 6800 held by individual 1900 at the address stance. Having recognized both horizontal axis 6221 and shaft axis 6820, image analysis module 2110 can calculate a static lie angle therebetween as one of fitting attributes 1960 for individual 1900. In some examples, image analysis module 2110 (FIG. 2) may automatically recognize the shaft of golf club 6800 from image data 6700 and determine shaft axis 6820 therefrom. There can also be examples where the location and/or orientation of shaft axis 6820 may be entered manually by user 1800 (FIG. 1) into on-screen interface 3100 for image analysis module 2110 (FIG. 2).

Image analysis module 2110 may also be configured to recognize dorsal axis 6620 substantially tangential to the back of individual 1900, and to calculate crouch angle 6720 between dorsal axis 6620 and vertical axis 1222. In some examples, image analysis module 2110 may automatically recognize the back of individual 1900 from image data 6700, and then determine dorsal axis 6620 therefrom. There can also be examples where the location and/or orientation of dorsal axis 6620 may be entered manually by user 1800 (FIG. 1) into on-screen interface 3100 for image analysis module 2110.

Image analysis module 2110 (FIG. 2) is also configured in the present example to recognize eye axis 6630 through eye 1952 of individual 1900 and perpendicularly intersecting horizontal axis 6221 at eye axis junction 6631 when individual 1900 is at the address position. Image analysis module can also be configured to recognize golf ball 6850, about which individual 1900 stands in the address stance. In some examples, image analysis module 2110 (FIG. 2) may automatically recognize golf ball 6850 and/or eye 1952 of individual 1900 from image data 6700, and then determine eye axis 6630 through eye 1952 to be perpendicular to horizontal axis 6221. There can also be examples where the location of golf ball 6850, eye 1952 and/or dorsal axis 6630 may be entered manually by user 1800 (FIG. 1) into on-screen interface 3100 for image analysis module 2110.

Having recognized golf ball 6850 and eye axis 6630, image analysis module 2110 (FIG. 2) can calculate stance style 6730 for the address stance of individual 1900, where stance style 6730 can be one of fitting attributes 1960 for individual 1900. In some embodiments, stance style 6730 may comprise (a) a ball-aligned stance style where eye axis 6630 intersects golf ball 6850 or where eye axis junction 6631 is within a ball-aligned area 6632 of, for example, approximately 3 centimeters (cm) around golf ball 6850, (b) a ball-outside stance style where eye axis junction 6631 is located outside the ball-aligned area 6632 and between golf ball 6850 and the feet of individual 1900, and (c) a ball-inside stance style where eye axis junction 6631 is located outside the ball-aligned area 6632 and where golf ball 6850 is located between eye axis junction 6631 and the feet of individual 1900. In some implementations, a shaft length of the shaft of golf club 6800 may be recommended or adjusted based on the stance style 6730 calculated by image analysis module 2110.

Figure 7:
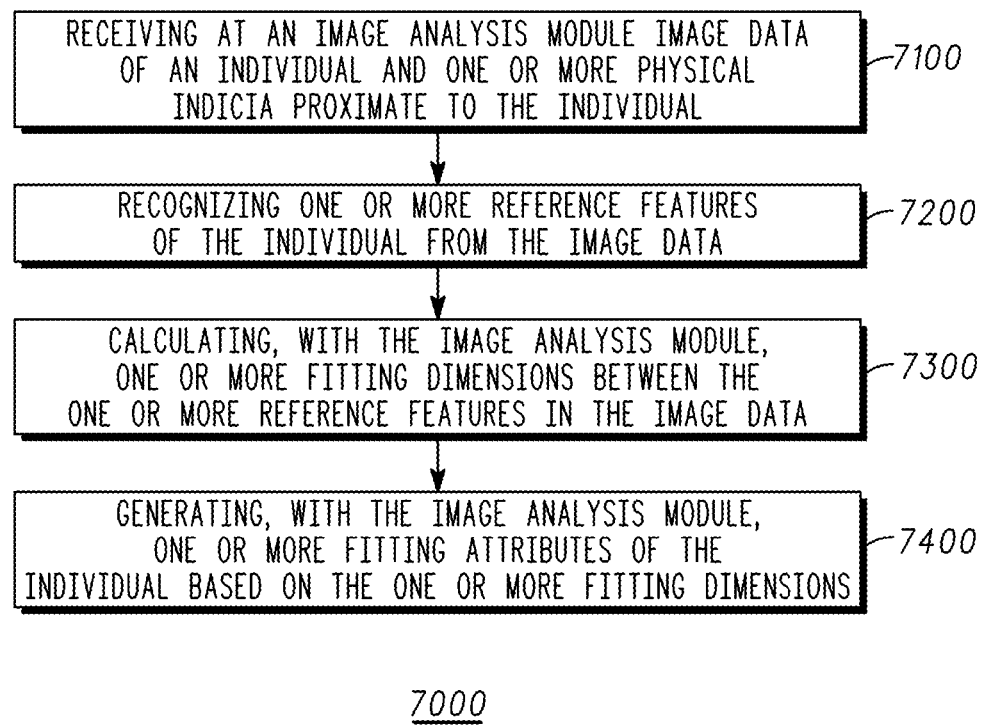
FIG. 7 illustrates a flowchart for a method of fitting an individual with golf equipment via a golf fitting system similar to the system of FIG. 1.

Moving on, FIG. 7 illustrates a flowchart for a method 7000 for fitting an individual with golf equipment via a golf fitting system. In some embodiments, the golf fitting system of method 7000 can be similar to system 1000 as described above with respect to FIGS. 1-5.

Method 7000 comprises block 7100 for receiving, at an image analysis module of an electronic device, image data of an individual and one or more physical indicia proximate to the individual. In some examples, the image analysis module can be similar to one or more portions of electronic device 1100, such as image analysis module 2110 and/or user interface module 2145 (FIG. 2). The image data received can be similar to image data 1700 (FIGS. 1, 3-4), image data 5700 (FIG. 5), and/or image data 6700 (FIG. 6). The physical indicium can be similar to physical indicium 1200 (FIGS. 1, 3-4, 6), physical indicium 5210 (FIG. 5), grid physical indicium 5250 (FIG. 5), and/or other physical indicium suitable for aligning the electronic device or a camera coupled thereto with respect to the individual.

Block 7200 of method 7000 comprises 7200 recognizing one or more reference features of the individual from the image data. In some examples, the one or more reference features can be one or more of reference features 1950 (FIGS. 1, 3, 6), such as head top 1951, eye 1952, shoulder 1953, elbow 1954, wrist 1955, hip 1956, knee 1957, ankle 1958, or foot 1959, and/or features such as horizontal axis 1221, vertical axis 1222, dorsal axis 6620, or eye axis 6630. The one or more reference features can also be one or more of reference features 5950 (FIG. 5), such as middle fingertip 5951, middle finger base crease 5953, or wrist crease 5952. In some examples, a portion of the one or more reference features can be at golf equipment, such as golf club 6800, and/or golf ball 6850 (FIG. 6). There can be examples where the image analysis module of block 7100 can be configured to automatically recognize at least a portion of the one or more reference features from the image data without user input. There can also be embodiments where the user may manually enter or otherwise identify at least a portion of the one or more reference features for the image analysis module. As an example, block 7200 can be performed by the image analysis module and/or manually.

Block 7300 of method 7000 comprises calculating, with the image analysis module, one or more fitting dimensions between the one or more reference features in the image data. In some examples, the one or more reference features can be one or more of fitting dimensions 1710 (FIG. 1), handgrip fitting dimension 5717 (FIG. 5), handsize fitting dimension 5711 (FIG. 5), Block 7400 of method 7000 comprises generating, with the image analysis module, one or more fitting attributes of the individual based on the one or more fitting dimensions. In some examples, the one or more fitting attributes can be one or more of a proposed shaft length for a golf club of the individual; glove size 5965 (FIG. 5), golf club grip size 5967 (FIG. 5), static lie angle 6710 (FIG. 6), crouch angle 6720 (FIG. 6), and/or stance style 6730 (FIG. 6).

In some examples, one or more of the different blocks of method 7000 can be combined into a single block or performed simultaneously, and/or the sequence of such blocks can be changed. For example, blocks 7300 and 7400 may be combined into a single block in some examples. In the same or other examples, some of the blocks of method 7000 can be subdivided into several sub-blocks. For example, block 7200 can comprise a sub-block for receiving or interpreting input from a user designating one or more of the reference features of the individual, and another sub-block for recognizing with the image analysis module other reference features based on the reference features entered by the user. There can also be examples where method 7000 can comprise further or different blocks. As an example, method 7000 can further comprise a block prior to block 7100 for taking a picture with a camera to gather the image data and sending the image data to the image analysis module. In addition, there may be examples where method 7000 can comprise only part of the steps described above. For instance, block 7400 can be optional in some examples. Other variations can be implemented for method 7000 without departing from the scope of the present disclosure.

In some examples, one or more portions of method 7000 of FIG. 7 may be implemented as machine-accessible instructions utilizing any of many different programming codes stored on any combination of machine-accessible media embodied in a mobile application (e.g., an app) and/or an online application for various wired and/or wireless communication devices such as handheld computers, smartphones, portable media players, tablet computers, etc. In addition or alternatively, the machine-accessible instructions may be embodied in a volatile or non-volatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a flash memory, a magnetic media, an optical media, and/or any other suitable type of medium. The systems, apparatus, methods, and articles of manufacture described herein are not limited in this regard.

Although the golf fitting systems and related methods herein have been described with reference to specific embodiments, various changes may be made without departing from the spirit or scope of the present disclosure. For example, although physical indicium 1210 is described as circular, there can be other embodiments comprising physical indicia and/or on-screen indicia with other geometrical shapes or quantities. In one example, such physical indicia and/or on-screen indicia may comprise a crosshair shape. In another example, such physical indicia and/or on-screen indicia may comprise several physical and on-screen dots configured to be respectively aligned with each other. In the same or other examples, image analysis module 2110 may comprise one or more sub-modules, such as image processing module 2111 and/or fitting module 2112 (FIG. 2). In some examples, image processing module 2111 of image analysis module 2110 can be configured to process image data received from camera 1150 and/or user input received via user interface module 2140. In the same or other examples, fitting module 2112 of image analysis module 2110 can be configured to generate one or more of the fitting dimensions or fitting attributes described above based on the processing of image data by image processing module 2111. Additional examples of such changes have been given in the foregoing description.

Other permutations of the different embodiments having one or more of the features of the various figures are likewise contemplated. As an example, system 1000 can be configured so that individual 1900 can self-fit for golf equipment, such that individual 1900 and user 1800 can comprise the same person if desired and/or such that individual 1900 can carry out at least a portion of the functions or interactions described herein with respect to user 1800. In such examples, electronic device 1100 and/or a camera such as camera 1150 may be held or aimed by a cameraman, or by a support mechanism such as a tripod, to capture image data such as image data 1700 (FIGS. 1, 3, 4), image data 5700 (FIG. 5), and/or image data 6700 (FIG. 6). Image analysis module 2110 (FIG. 2) can be configured to retain such image data for subsequent access thereof by individual 1900, acting as user 1800, via a user interface module such as user interface module 2140 (FIG. 2) and/or via an on-screen interface such as on-screen interface 3100 (FIGS. 3, 5, 6). Accordingly, with the retained image data, the individual being fit may self-fit for the golf equipment if desired.

Furthermore, although electronic device 1100, camera 1150, fitting processor module 1160, image analysis module 2110, user interface module 2140 are shown in FIGS. 1-2 as self-contained in a single unit, there can be other embodiments where one or more of such elements may be distributed amongst more than one unit. As an example, in some embodiments, camera module 1150 may be part of a camera unit separate and/or remote from electronic device 1100, but where image analysis module 2120 can still be configured to receive image data such as image data 1700 captured by the camera module of the separate or remote camera unit.

The specification and drawings herein are intended to be illustrative of the scope of the disclosure and are not intended to be limiting. It is intended that the scope of this application shall be limited only to the extent required by the appended claims.

The golf fitting systems and related methods discussed herein may be implemented in a variety of embodiments, and the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claims.

As the rules to golf may change from time to time (e.g., new regulations may be adopted or old rules may be eliminated or modified by golf standard organizations and/or governing bodies such as the United States Golf Association (USGA), the Royal and Ancient Golf Club of St. Andrews (R&A), etc.), golf equipment related to the apparatus, methods, and articles of manufacture described herein may be conforming or non-conforming to the rules of golf at any particular time. Accordingly, golf equipment related to the apparatus, methods, and articles of manufacture described herein may be advertised, offered for sale, and/or sold as conforming or non-conforming golf equipment. The apparatus, methods, and articles of manufacture described herein are not limited in this regard.

While the above examples may be described in connection with a putter-type golf club, the apparatus, methods, and articles of manufacture described herein may be applicable to other types of golf club such as a fairway wood-type golf club, a hybrid-type golf club, an iron-type golf club, a wedge-type golf club, or a driver-type golf club. Alternatively, the apparatus, methods, and articles of manufacture described herein may be applicable other type of sports equipment such as a hockey stick, a tennis racket, a fishing pole, a ski pole, etc.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system for fitting golf equipment for an individual and configured to be used with an electronic device comprising a fitting processor module and a camera,
   the system comprising:
   an image analysis module configured to:
   receive image data of a single picture captured by the camera and depicting:
   at least a portion of the individual at a first posture; and
   one or more physical indicia, pursuant to which the single picture is aligned, being distinct from a fitting golf club;
   recognize one or more reference features of the individual from the image data of the single picture; and
   calculate one or more fitting dimensions of the individual between the one or more reference features in the single picture;
   wherein:
   the portion of the individual in the single picture comprises at least a hand of the individual; and
   the image analysis module is executable by the fitting processor module and configured to calculate the one or more fitting dimensions from the single picture captured by the camera.

2. The system of claim 1, wherein:
   the image analysis module is configured to recognize at least a portion of the one or more reference features from the image data without user input marking the portion of the one or more reference features.

3. The system of claim 1, further comprising:
a user interface module coupled to the image analysis module and configured to generate an on-screen interface for a user of the system;
wherein:
the on-screen interface comprises an illustration of the image data depicting the portion of the individual and the one or more reference features relative to the one or more physical indicia; and
the user interface module is configured to be executed by the fitting processor module.

4. The system of claim 3, wherein:
the user interface module is configured to:
receive one or more reference feature markers entered at the on-screen interface by the user to designate a location of at least a portion of the one or more reference features.

5. The system of claim 3, wherein:
the on-screen interface is configured to illustrate one or more reference feature markers marking the one or more reference features, where such one or more reference feature markers are non-physical but rendered at the on-screen interface by the user interface module.

6. The system of claim 3, wherein:
the one or more physical indicia comprise a first physical indicium;
the on-screen interface is configured to present:
a first on-screen indicium configured to be aligned with the first physical indicium to establish for the image data at least one of a target distance or a target orientation of the on-screen interface relative to the first physical indicium;
and
the first on-screen indicium is non-physical but rendered at the on-screen interface by the user interface module.

7. The system of claim 6, wherein:
the first physical indicium comprises:
a physical geometric shape with one or more physical dimensions;
the first on-screen indicium comprises:
an on-screen geometric shape with one or more on-screen dimensions corresponding to the one or more physical dimensions of the physical geometric shape; and
the target distance is established between the on-screen interface and the first physical indicium when the one or more on-screen dimensions of the on-screen geometric shape are aligned with the one or more physical dimensions of the physical geometric shape at the on-screen interface.

8. The system of claim 7, wherein:
the one or more physical dimensions of the physical geometric shape comprise a physical perimeter of the physical geometric shape;
the one or more on-screen dimensions of the on-screen geometric shape comprise an on-screen perimeter of the on-screen geometric shape;
the on-screen perimeter of the on-screen geometric shape is configured to match the physical perimeter of the physical geometric shape when the target distance and the target orientation are established between the camera and the first physical indicium.

9. The system of claim 7, wherein:
the user interface module is coupled to a gravitational sensor configured to sense a gravitational axis; and
the on-screen interface is configured to present:
a leveling on-screen indicia configured to guide a vertical alignment of the on-screen interface with the gravitational axis based on feedback from a gravitational sensor module coupled to the fitting processor module.

10. The system of claim 7, wherein:
the image-analysis module is configured to:
recognize an alignment mismatch between the first on-screen indicium and the first physical indicium, the alignment mismatch comprising at least one of:
a distance misalignment comprising a distance other than the target distance between the on-screen interface and the first physical indicium; or
an orientation misalignment comprising an orientation other than the target orientation between the on-screen interface and the first physical indicium;
and
the user interface module is configured to:
present one or more on-screen guidance at the user interface module to correct the alignment mismatch.

11. The system of claim 3, wherein:
the one or more reference features comprise:
a middle fingertip of a middle finger of the hand; or
a wrist crease of a wrist coupled to the hand;
the one or more fitting dimensions comprise:
a handsize fitting dimension corresponding to a distance from the middle fingertip to the wrist crease; and
the image analysis module is configured to calculate a glove size fitting attribute of the individual based on the handsize fitting dimension.

12. The system of claim 3, wherein:
the one or more reference features comprise:
a middle fingertip of a middle finger of the hand; or
a middle finger base crease at an interface between the middle finger and a palm of the hand;
the one or more fitting dimensions comprise:
a handgrip fitting dimension corresponding to a distance from the middle fingertip to the middle finger base crease;
and
the image analysis module is configured to calculate a golf club grip size fitting attribute of the individual based on the handgrip fitting dimension.

13. The system of claim 3, wherein:
the electronic device, the camera, the fitting processor module, the image analysis module, and the user interface module are self-contained in a single unit comprising at least one of:
a smartphone; or
a tablet computer;
the one or more reference features comprise at least one of:
a middle fingertip of a middle finger of the hand;
a wrist crease of a wrist coupled to the hand; or
a middle finger base crease at an interface between the middle finger and a palm of the hand;
and
the image analysis module is configured to calculate one or more fitting attributes based on the one or more fitting dimensions, the one or more fitting attributes comprising at least one of:
a glove size attribute of the individual; or
a golf club grip size attribute of the individual.

14. The system of claim 1, wherein:
the image analysis module is configured to:
generate one or more fitting dimensions of the individual based on the one or more fitting dimensions.

15. A method for fitting golf equipment for an individual, the method comprising:
providing an image analysis module configured for:
receiving image data of a single picture captured by a camera and depicting:
at least a hand of the individual; and
one or more physical indicia, pursuant to which the single picture is aligned, being distinct from a fitting golf club;
wherein the single picture is received from an image capture module of a handheld golf-fitting electronic device comprising a fitting processor module and the camera;
recognizing one or more reference features of the individual from the image data of the single picture; and
calculating one or more fitting dimensions of the individual between the one or more reference features in the single picture;
wherein:
the image analysis module is executable by the fitting processor module and configured to calculate the one or more fitting dimensions from the single picture captured by the camera.

16. The method of claim 15, further comprising:
providing a user interface module coupled to the image analysis module and configured to generate an on-screen-interface for a user of the system;
wherein:
the on-screen interface comprises an illustration of the image data depicting a portion of the hand of the individual and the one or more reference features relative to the one or more physical indicia; and
the image analysis module is configured to be executed by the fitting processor module.

17. The method of claim 16, wherein:
providing the user interface module comprises:
configuring the on-screen interface to illustrate one or more reference feature markers marking the one or more reference features, the one or more reference feature markers being at least one of:
automatically recognized from the image data by the image analysis module; or
entered at the on-screen interface by the user;
configuring the on-screen interface to present:
a first on-screen indicium configured to be aligned with a first physical indicium of the one or more physical indicia to establish for the image data at least one of a target distance or a target orientation of the on-screen interface relative to the first physical indicium;
and
providing the image analysis module comprises:
configuring the image analysis module for at least one of:
calculating a glove size of the individual;
calculating a golf club grip size of the individual.

18. The method of claim 16, wherein:
the handheld golf-fitting electronic device, the camera, the fitting processor module, the image analysis module, and the user interface module are self-contained in a single unit comprising at least one of:
a smartphone; or
a tablet computer.

19. An image analyzer for fitting golf equipment for an individual and configured to be used with an electronic device comprising a fitting processor module and a camera, the image analyzer comprising:
an image processing module configured to:
receive image data of a single picture captured by the camera and depicting:
at least a hand of the individual; and
one or more physical indicia, pursuant to which the single picture is aligned, being distinct from a fitting golf club;
and
recognize one or more reference features of the individual from the image data of the single picture;
and
a fitting module configured to:
calculate one or more fitting dimensions of the hand of the individual between the one or more reference features in the single picture;
wherein:
the fitting module is configured to calculate the one or more fitting dimensions from the single picture captured by the camera.

20. The image analyzer of claim 19, further comprising:
a user interface module configured to generate an on-screen interface for a user of the image analyzer;
wherein:
the image processing module and the fitting module are configured to be self-contained with the electronic device, the camera, the image analyzer, and the fitting processor module as a single unit comprising at least one of a smartphone or a tablet computer;
the image analyzer is executable by the fitting processor module of the electronic device;
the one or more physical indicia comprise a first physical indicium;
the on-screen interface comprises:
an illustration of the image data depicting the at least the hand of the individual and the one or more reference features relative to the one or more physical indicia; and
a first on-screen indicium configured to be aligned with the first physical indicium to establish for the image data at least one of a target distance or a target orientation of the on-screen interface relative to at least one of:
the first physical indicium;
a horizontal axis of a ground plane upon which the individual stands; or
a vertical axis substantially perpendicular to the ground plane;
the image processing module is configured to recognize from the image data at least one of:
a middle fingertip of a middle finger of a hand of the individual;
a middle finger base crease at an interface between the middle finger and a palm of the hand; or
a wrist crease of a wrist coupled to the hand;
the one or more fitting dimensions comprise at least one of:
a handsize fitting dimension corresponding to a distance from the middle fingertip to the wrist crease; or
a handgrip fitting dimension corresponding to a distance from the middle fingertip to the middle finger base crease;
and
the fitting module is configured to calculate one or more fitting attributes of the individual based on the one or more fitting dimensions, the one or more fitting attributes comprising at least one of:
a glove size attribute of the individual; or
a golf club grip size attribute of the individual.

\* \* \* \* \*